US008405006B2

(12) United States Patent
Staab

(10) Patent No.: US 8,405,006 B2
(45) Date of Patent: Mar. 26, 2013

(54) SMALL FOOTPRINT HEATER

(75) Inventor: Torsten Albert Staab, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 1150 days.

(21) Appl. No.: 12/242,847

(22) Filed: Sep. 30, 2008

(65) Prior Publication Data

US 2010/0078422 A1 Apr. 1, 2010

(51) Int. Cl.
*H05B 1/02* (2006.01)
*G01N 1/00* (2006.01)

(52) U.S. Cl. ........ 219/494; 219/385; 219/413; 436/174; 436/180; 436/43; 436/45; 422/68.1; 422/64; 422/67; 422/63; 141/145

(58) Field of Classification Search .................. 219/385, 219/413, 494; 436/174, 180, 43, 45; 422/104, 422/100, 67, 63–64, 68.1; 141/145
See application file for complete search history.

(56) References Cited

U.S. PATENT DOCUMENTS

| | | | | |
|---|---|---|---|---|
| 401,950 | A | 4/1889 | Haussmann | |
| 4,833,384 | A | 5/1989 | Munro et al. | |
| 4,889,692 | A | 12/1989 | Holtzman | |
| 5,601,711 | A | 2/1997 | Sklar et al. | |
| 5,871,699 | A | 2/1999 | Ruggeri | |
| 5,948,673 | A | 9/1999 | Cottingham | |
| 6,090,572 | A | 7/2000 | Crosby | |
| 7,238,520 | B2 | 7/2007 | Brown et al. | |
| 2004/0052685 | A1 * | 3/2004 | Richards et al. | 422/64 |
| 2004/0241874 | A1 | 12/2004 | Abdel-Rehim | |
| 2005/0132775 | A1 | 6/2005 | Laugharn, Jr. et al. | |
| 2005/0133425 | A1 | 6/2005 | Pitt et al. | |
| 2006/0166347 | A1 | 7/2006 | Faulstich et al. | |

* cited by examiner

*Primary Examiner* — Shawntina Fuqua
(74) *Attorney, Agent, or Firm* — John P. O'Banion

(57) ABSTRACT

A device for heating a biological sample, the device having a heating source comprising a semiconductor chip. A sample chamber, or other medium to be heated, is positioned adjacent the heating source, wherein the sample chamber is configured to house a biological sample at a predetermined temperature. A microcontroller is electrically coupled to the semiconductor chip and a sensor positioned inside, at, or near the sample chamber. The microcontroller supplies a load current to the heating source to generate heat from the heating source, and the sensor is coupled to the microcontroller to provide feedback for controlling the heat generated by the heating source. The device may also support different heating profiles that are software and/or hardware selectable.

20 Claims, 3 Drawing Sheets

SMALL FOOTPRINT HEATER

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to small portable heater, and more particularly to a heater for sample preparation and/or analysis.

2. Description of Related Art

Technological advancements in the field of proteomics, genomics, immunology, medicine and environmental science have greatly expanded the number of diagnostic and analytical procedures that are available to researchers, government officials and health care practitioners. Many of the analytical capabilities previously confined to the laboratory have been brought to the field to provide real time results at the site of specimen collection. Some of the high costs and high levels of technical expertise that are needed for laboratory analyses have been eliminated through standardization and optimized protocols and kits.

The success of many diagnostic procedures and methods depends, in part, upon the preparation and quality of an acquired specimen. Improper sampling protocols and sample preparation can result in a loss of sample integrity, contamination, inconclusive results, false positives, or poor yields.

Similarly, recent advances in analytical techniques of isolation, manipulation, and analysis of nucleic acids have created new tools for academic research, forensics and medical diagnosis. The initial preparation steps with a nucleic acid sample can be critical to the success of the subsequent analytical procedures. For example, Polymerase Chain Reaction or PCR, is a powerful DNA replication system that allows the selective amplification of target DNA sequences. Target sequences can be replicated many times over in a period of a few hours to produce a significant quantity of material for analysis. PCR can be used to amplify very small sample quantities of DNA or degraded samples of DNA for analysis. In many instances, PCR has provided conclusive identifications of individuals in cases where conventional DNA typing was inconclusive or ineffective.

Accurate and reliable analytical procedures of biological material are particularly important in forensics because of the significance of the use of the results. For example, the analysis of samples of blood, semen, other body fluids and similar biological evidence has become an essential tool for law enforcement investigators who are attempting to identify an individual who has perpetrated a violent crime. Biological evidence may be the only evidence that ties a suspect to a particular crime or that clears an innocent suspect of a crime. A composite of pieces of forensic evidence permit a reliable reconstruction of a crime and the activities of the participants in the crime as well as the victim. Some of the most crucial pieces of evidence that are gathered during a criminal investigation include biological evidence from samples containing blood, fibers, hair, and semen.

One problem found with existing preparation systems is the need for sophisticated instruments that cannot be readily taken to the field or place of sample collection. Providing electrical power to sensitive instruments cannot be reasonably accomplished in the field.

In addition, sophisticated lab technicians are required to operate such instruments essentially eliminating DNA-based health diagnostics tests that can be performed at home. A normal home user would not have the skills or auxiliary equipment necessary to perform such tests.

Sample preparation steps are therefore important to the success of advanced molecular analytical techniques. Some sample preparation protocols, such as DNA amplification, may require heating of the sample material. For example, for DNA amplification, the sample must be heated up and kept at 60 deg C. for 30-60 minutes.

Accordingly, an object of the present invention is to provide a small footprint heater for heating biological samples. Another object is to provide a small footprint heater that is inexpensive to manufacture. Yet another object is to provide a small footprint heater that provides safe heating for a variety of applications. At least some of these objects will be met in the foregoing description.

BRIEF SUMMARY OF THE INVENTION

An aspect of the present invention is a heater having a heating source comprising a semiconductor chip. A microcontroller that is electrically coupled to the semiconductor chip and a sensor positioned at or near the semiconductor, wherein the microcontroller supplies a load current to the semiconductor chip to generate heat from the chip, and wherein the sensor is coupled to the microcontroller to provide feedback for controlling the heat generated by the semiconductor heating source.

In one embodiment, the heater also includes a sample chamber positioned adjacent the heating source, wherein the sample chamber is configured to house a biological sample at a predetermined temperature. It is also contemplated that the heater of the present invention may be used to heat a number of different items, such as equipment, apparel, food, etc.

In one embodiment, the microcontroller is configured to vary the supplied load current to vary the gate voltage of the heating source, wherein the gate voltage affects the heat generated by the heating source.

In a preferred embodiment, a battery is used for supplying power to the microcontroller and heating source. However, other power supply means may also be used.

In another embodiment, the microcontroller is configured to supply current to the heating source according to a predetermined heating profile.

The heating source may comprise any type of semiconductor chip that generates heat, including a MOSFET or the like.

Another aspect of the present invention is a device for heating a biological sample, the device having a heating source comprising a semiconductor chip. A sample chamber is positioned adjacent the heating source, wherein the sample chamber is configured to house a biological sample at a predetermined temperature. A microcontroller is electrically coupled to the semiconductor chip and a sensor positioned inside, at, or near the sample chamber. The microcontroller supplies a load current to the heating source to generate heat from the heating source, and the sensor is coupled to the microcontroller to provide feedback for controlling the heat generated by the heating source.

Another aspect is a method for generating heat, comprising: providing a heating source comprising a semiconductor chip; supplying a current to the heating source to generate heat from the heating source; sensing the temperature at or near the heating source; and varying the current supplied to the heating source to control the heat generated by the heating source.

In one embodiment of the current aspect, the method further includes: providing a microcontroller that is electrically coupled to the semiconductor chip; and controlling the current supplied to the heating source to control the heat generated.

In another embodiment, varying the supplied current to the heating source varies the gate voltage of the heating source, wherein the gate voltage affects the heat generated by the heating source.

In another embodiment, a sample chamber positioned adjacent the heating source is heated with the heat generated by the heating source, wherein the sample chamber is configured to house a biological sample at a predetermined temperature.

Another aspect is a method for heating a biological sample by providing a heating source comprising a semiconductor chip, supplying a current to the heating source to generate heat from the heating source, and heating a sample chamber with the heat generated by the heating source, wherein the sample chamber positioned in proximity the heating source and is configured to house a biological sample at a predetermined temperature. The method may further include sensing the temperature at or near the heating source, and varying the load current supplied to the heating source to control the heat generated by the heating source.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
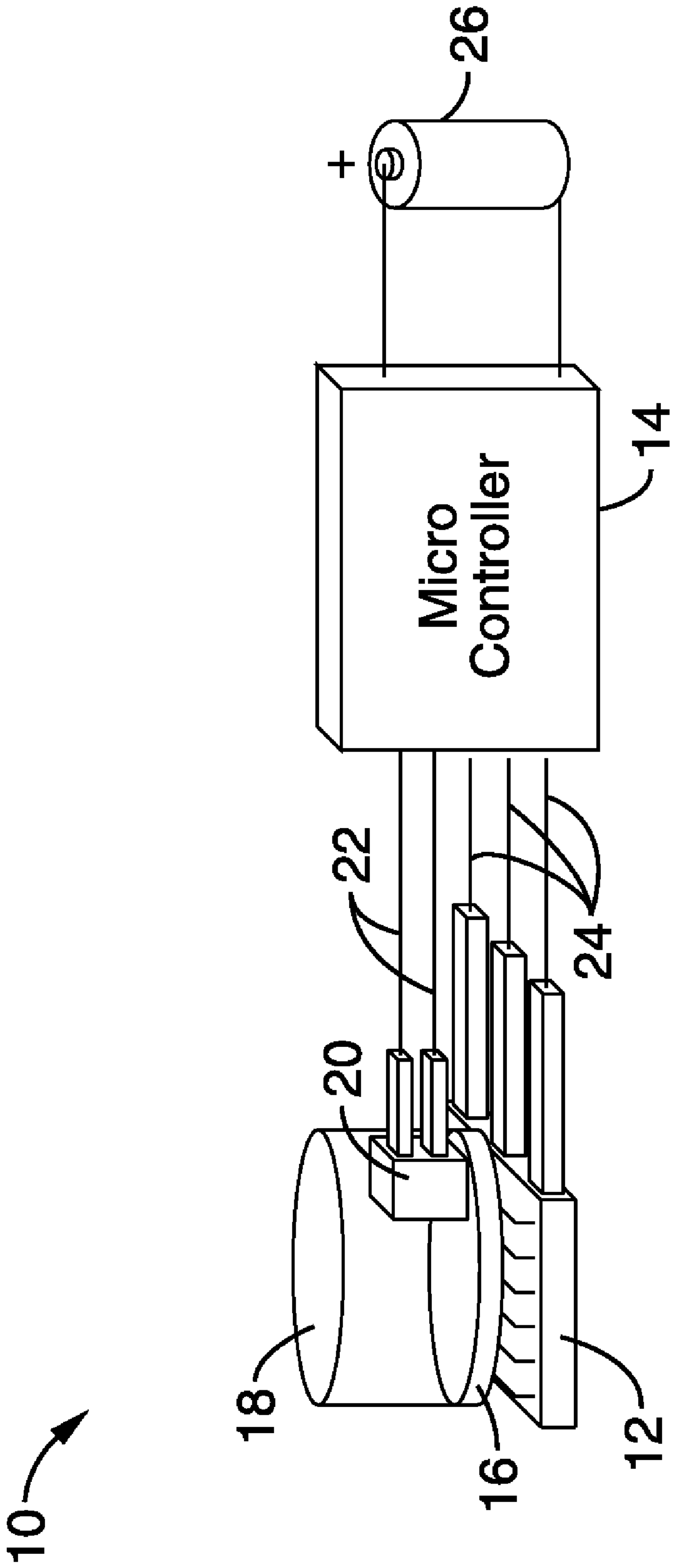
FIG. 1 is a schematic side view of an illustrative sample preparation cartridge according to the present invention.
Figure 2:
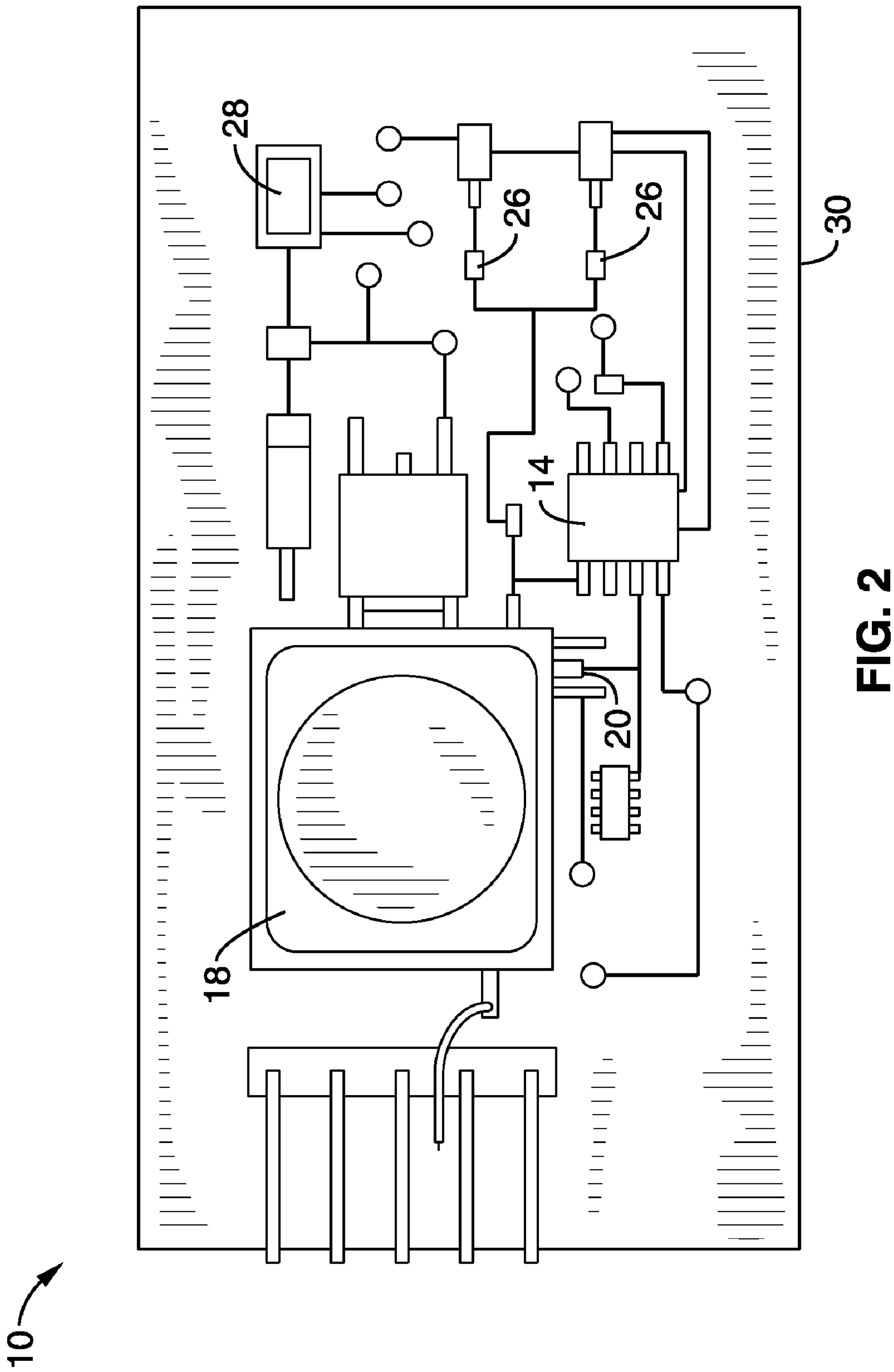
FIG. 2 is a perspective view of the heater of the present invention
Figure 3:
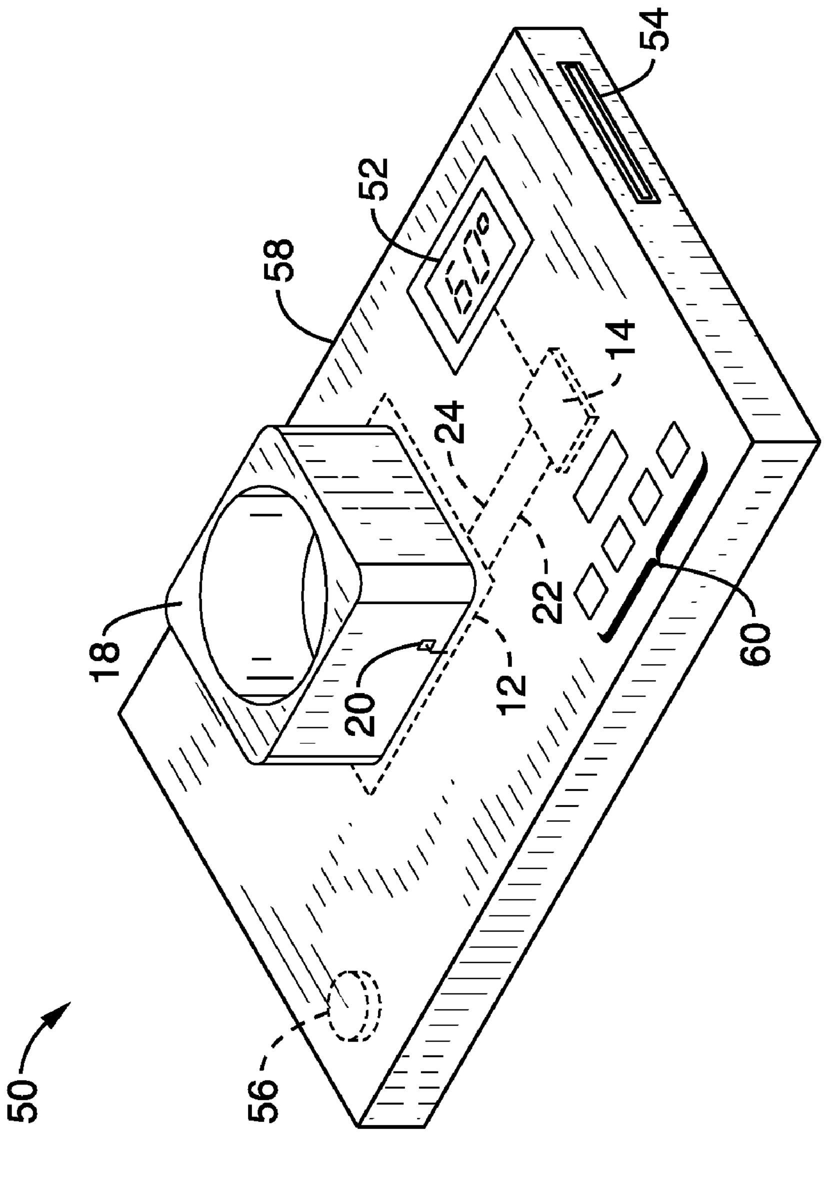
FIG. 3 illustrates an alternative embodiment of the heater of the present invention.

Referring more specifically to the drawings, for illustrative purposes the present invention is embodied in the apparatus generally shown in FIG. 1 through FIG. 3. It will be appreciated that the apparatus may vary as to configuration and as to details of the parts without departing from the basic concepts as disclosed herein.

FIG. 1 illustrates a low-cost, small footprint, battery-operated heater unit 10 in accordance with the present invention. The heater 10 may be integrated into a number of applications, including a sample collection system as detailed in pending U.S. application Ser. No. 11/875,702, filed on Oct. 19, 2007, entitled "SAMPLE PREPARATION CARTRIDGE AND SYSTEM," herein incorporated by reference in its entirety.

The apparatus 10 uses a heating source 12 that preferrably comprises a semiconductor component, such as a MOSFET (Metal Oxide Semiconductor Field Effect Transistor). Although a MOSFET is used in the embodiments described herein, the heater 10 of the present invention is not limited to the use of a MOSFET. Since the functionally of the MOSFET (i.e., electronic switching) is not actually used, other semiconductor components that generate high surface temperatures during operation may be used as well (e.g. transistor-transistor logic (TTL) or NMOS logic, or other FET's such as ap-n junction (JFET), or metal-semiconductor contact (MESFET) or the like. The "excess" heat that is being emitted by the semiconductor component during operation is used to provide heat a safe and predictable heating source.

The unique heating aspect of the semiconductor 12 provide a heating source that does not result in a flame, spark, or red heat that is common with conventional heating sources. Rather, the heat emitted from the semiconductor is safe and controllable.

As further shown in FIG. 1, the semiconductor 12 is coupled to a microcontroller 14 via leads 24. A power source 26, preferrably a portable source such as a battery (or set of AA batteries), is coupled to the microcontroller to provide power to the semiconductor 12. The micropocessor 14 controls the amount of current to the heater 12 to increase or decrease the desired output heat. For example, to increase the temperature (which in case of a MOSFET semiconductor 12 can easily be as high as 150 deg C.), the microcontroller 14 simply increases the load current of the semiconductor 12 by increasing its gate voltage. Reducing the temperature works similarly by reducing the load current.

As further illustrated in FIG. 1, the semiconductor 12 is positioned under or adjacent a sample chamber 18 where the desired heating is directed. To minimize heat loss, the semiconductor 12 may be directly attached to the sample chamber 18 (and the chamber may be insulated with materials such as styrofoam).

A temperature probe or sensor 20 may also be attached at or near the sample chamber to provide feedback for driving the semiconductor 12. The probe 12 is couple to the microcontroller 14 via leads 22 such that the temperature readout from the controller 14 to run a temperature control loop. Thus if the probe 20 senses a temperature above a particular threshold, the load current of the semiconductor 12 is shut off or decreases by descreating or cutting off its gate voltage. Correspondingly, if the probe 20 senses a temperature below a particular threshold, the load current of the semiconductor 12 is turned on or increased by increasing its gate voltage.

The microcontroller 14 enables the user to program in a variety of timer-controller heating profiles, thus enabling the system to run any type of heating cycle or interval (e.g., 60 deg C.-90 deg C.-60 deg C.) on the sample. Cycle times may also be software-programmed. (e.g., 5 min at 60 deg C., 4.3 min at 72 dec C., etc.)

It is preferable to position the probe 20 as close to the sample 18 as possible. Depending on the sample, the temperature probe 20 may be even immersed in the sample.

The better the chamber 18 is insulated and the closer the heat source 12 is to the sample, the less battery power is needed. The exact battery input capacity depends on how high the target temperature(s) are and for how long the system needs to maintain them.

In case of the MOSFET semiconductor heating source 12, the surface temperature is proportional to its load current.

Accordingly, the sensor 20 may also be positioned at or near the surface of the semiconductor 12 to assure that the semiconductor does not exceed a threshold limit.

The microcontroller may be pre-programmed to operate at a set temperature profile or multiple set point, or may be provided with an interface (as shown in heater 50 in FIG. 3) that allows heating profiles to be downloaded to the controller 14 or changed via software reconfiguration.

FIG. 2 illustrates the heater 10 of the present invention implemented on circuit board 30. The semiconductor heating source 12 and probe 20 are coupled to the microcontroller 14. A sample chamber 18 is positioned above the heating source 12 for direct heating. One or more resistors 26 may be incorporated to limit current to the semiconductor 12. A switch 28 may also be incorporated to turn the unit on or off. T It is appreciated that the circuit board 30 or other electronics do not need to be colocated with be co-located with the sample chamber 18 or object that is being heating. For example, the circuit board 30 may be located away from the heating source (semiconductor 12) if so desired. Of course, the heating element 12 (e.g., MOSFET) and temperature probe 20 are ideally located at or near the heating source or item to be heated. The remaining components may reside elsewhere and be simply connected via a wire or flex-cable.

FIG. 3 illustrates an alternative heating system 50 that incorporates a visual indicator 52 to show the status of the heater. The indicator 52 may comprise a LCD or other type of display 52 that displays the temperature or profile/programming information received from the microcontroller 14. For a lower-cost variation, the indicator may comprise one or more led's to indicate the status of the heater.

The heater 50 may have a housing 58 configured to house the heating source 12, microcontroller 14, display 52, sensor 20, power source (e.g. battery) 56, and provide a surface for which the sample 18 is positioned for heating. The microntroller 14 may comprise memory for holding one or more temperature profiles, or additional separate memory may be coupled to the microcontroller (not shown).

One or more heating profiles may be preprogrammed or hard-wired into the microcontroller 14 or memory. In addition, the device may be reprogrammed on the fly via interface 54 (e.g. USB or field programmer input). The housing may also support one or more buttons 60 for toggling through heating cycles, modifying the temperature or heating cycles (e.g. changing the desired temperatures or time periods), or facilitating updates to the memory on the device 50.

The power source 56 preferrably comprises a replaceable or rechargeable battery to maintain portability. However, the heater 50 may be configured to connect to fuel cell, solar power cell, or a direct power source (e.g. 110 volt AC).

In another embodiment, a thermal switch (e.g., bi-metal strip/thermostat) may be coupled to the semiconductor heating source 12. In this instance, the thermal switch would take over the function of the temperature probe 20 and microcontroller 14, i.e., it would automatically disconnect the heating source 12 from its power supply 58 once it reaches a certain setpoint. To do so, the thermal switch (not shown) would to be co-located adjacent with (or inside) the sample chamber 18 or object being heated.

Once the temperature falls below a setpoint, the thermal switch would (mechanically) close again and re-energize the heating source to heat up again ((just like a thermostat in a house heating system). Of course, this approach would not allow for tight temperature control and timer-controlled, multi-setpoint heating profiles as described above. However, for a dedicated, single purpose heating application that doesn't require tight temperature control, this may be a viable low-cost alternative.

The embodiments disclosed above show the biological sample chamber 18 as the subject matter to be heated with the heater 10 of the present invention. However, it is appreciated that the heater 10 of the present invention may be used to heat a number of different subjects. For example, the heater 10 may be used as a portable warming plate for food or drink (whereas the semiconductor would be positioned under a plate or bowl in place of the sample chamber 18), or could be placed under or in a planting pot to keep a plant at a certain temperature. The heater would be advantageous for applications in apparel, such as gloves, boots, or jackets, to warm the user in a safe and portable fashion. The heater 10 may also be used to warm instrumentation, such as optics, under situations where temperature affects performance of the instrument.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A heater, comprising:

a heating source comprising a semiconductor chip;

the semiconductor chip being responsive to a load current such that the semiconductor chip is configured to generate heat upon application of the load current;

a microcontroller electrically coupled to the semiconductor chip; and a sensor positioned at or near the heating source;

wherein the microcontroller is configured to control delivery of the load current to the semiconductor chip to generate heat from the heating source;

wherein the sensor is coupled to the microcontroller to provide feedback for controlling the heat generated by the heating source.

2. A heater as recited in claim 1, further comprising:

a sample chamber positioned adjacent the heating source;

the sample chamber configured to house a biological sample at a predetermined temperature.

3. A heater as recited in claim 1, wherein the microcontroller is configured to vary the supplied load current to vary the gate voltage of the heating source;

said gate voltage affecting the heat generated by the heating source.

4. A heater as recited in claim 1, further comprising a battery for supplying power to the microcontroller and heating source.

5. A heater as recited in claim 1, wherein the microcontroller is configured to supply current to the heating source according to a predetermined heating profile.

6. A heater as recited in claim 1, wherein the semiconductor chip comprises a MOSFET.

7. A device for heating a biological sample, comprising:
a heating source comprising a semiconductor chip;
the semiconductor chip being responsive to a load current such that the semiconductor chip is configured to generate heat upon application of the load current;
a sample chamber positioned adjacent the heating source;
the sample chamber configured to house a biological sample at a predetermined temperature;
a microcontroller electrically coupled to the semiconductor chip; and
a sensor positioned at or near the sample chamber;
wherein the microcontroller is configured to control delivery of the load current to the heating source to generate heat from the heating source;
wherein the sensor is coupled to the microcontroller to provide feedback for controlling the heat generated by the heating source.

8. A heating device as recited in claim 7, wherein the microcontroller is configured to vary the supplied load current to vary the gate voltage of the heating source;
said gate voltage affecting the heat generated by the heating source.

9. A heating device as recited in claim 7, further comprising a battery for supplying power to the microcontroller and heating source.

10. A heating device as recited in claim 7, wherein the microcontroller is configured to supply current to the heating source according to a predetermined heating profile.

11. A heating device as recited in claim 7, wherein the semiconductor chip comprises a MOSFET.

12. A method for generating heat, comprising:
providing a heating source comprising a semiconductor chip;
the semiconductor chip being responsive to a load current such that the semiconductor chip is configured to generate heat upon application of the load current;
supplying the load current to the semiconductor chip to generate heat from the semiconductor chip;
sensing the temperature at or near the heating source; and
varying the current supplied to the semiconductor chip to control the heat generated by the semiconductor chip.

13. A method as recited in claim 12, further comprising:
providing a microcontroller that is electrically coupled to the semiconductor chip; and
controlling the current supplied to the heating source to control the heat generated.

14. A method as recited in claim 13, wherein varying the supplied current to the heating source varies the gate voltage of the heating source;
said gate voltage affecting the heat generated by the heating source.

15. A method as recited in claim 13, further comprising:
heating a sample chamber positioned adjacent the heating source with the heat generated by the heating source;
wherein the sample chamber is configured to house a biological sample at a predetermined temperature.

16. A method as recited in claim 13, further comprising:
supplying current to the heating source according to a predetermined heating profile.

17. A method for heating a biological sample, comprising:
providing a heating source comprising a semiconductor chip;
the semiconductor chip being responsive to a load current such that the semiconductor chip is configured to generate heat upon application of the load current;
supplying a current to the semiconductor chip to generate heat from the semiconductor chip;
heating a sample chamber with the heat generated by the heating source;
the sample chamber positioned in proximity the heating source
wherein the sample chamber is configured to house a biological sample at a predetermined temperature;
sensing the temperature at or near the heating source; and
varying the load current supplied to the heating source to control the heat generated by the heating source.

18. A method as recited in claim 17, further comprising:
providing a microcontroller that is electrically coupled to the semiconductor chip; and
controlling the current supplied to the heating source to control the heat generated.

19. A method as recited in claim 17, wherein varying the supplied current to the heating source varies the gate voltage of the heating source;
said gate voltage affecting the heat generated by the heating source.

20. A method as recited in claim 18, further comprising:
supplying current to the heating source according to a predetermined heating profile.

* * * * *